Patented Mar. 25, 1924.

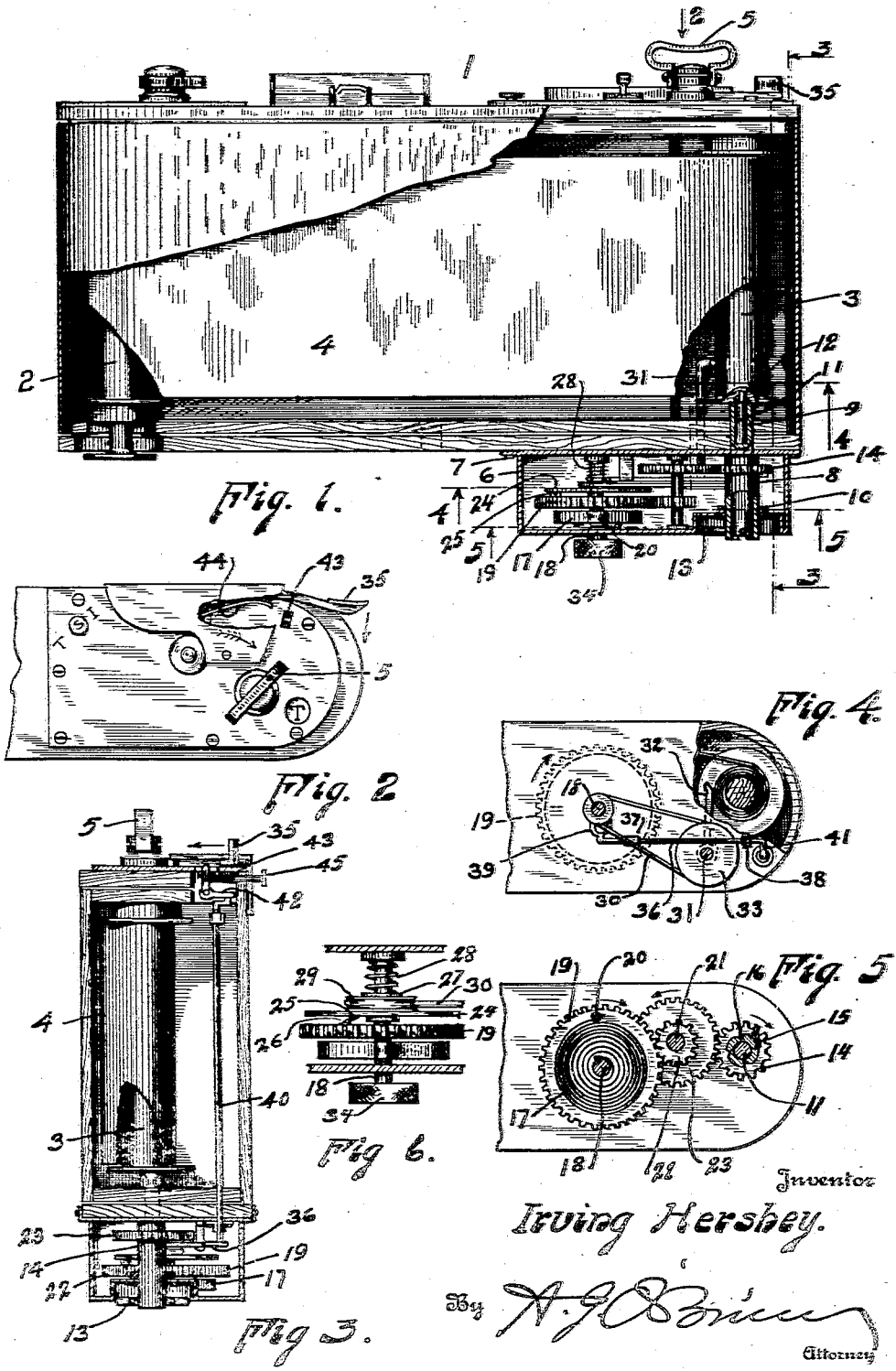

1,487,741

UNITED STATES PATENT OFFICE.

IRVING HERSHEY, OF DENVER, COLORADO.

AUTOMATIC FILM-SHIFTING DEVICE FOR CAMERAS.

Application filed June 19, 1922. Serial No. 569,421.

*To all whom it may concern:*

Be it known that I, IRVING HERSHEY, a citizen of the United States, residing at the city and county of Denver and State of Colorado, have invented certain new and useful Improvements in Automatic Film-Shifting Devices for Cameras; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a mechanism adapted to be incorporated into the construction of a film camera for the purpose of automatically shifting the film after each exposure.

The ordinary camera employing film is so constructed that the operator must place a new film or a new portion of the film into operative position after every exposure. It often happens that the operator forgets to wind the film so as to guard the exposed portion from another exposure, with the result that two pictures are spoiled through a double exposure.

It is the object of this invention to produce an improvement that can be attached to or built into any camera of ordinary construction, and which will function to wind a predetermined length of film from one spool to the other when an exposure has been made, thus making the camera fully automatic in its operation.

In order to more clearly describe my invention, I shall have reference to the accompanying drawing, in which—

Fig. 1 represents an ordinary camera having my improved film winding means incorporated therein, parts being broken away so as to more clearly disclose the mechanism employed;

Fig. 2 is a fragmentary view of one end of the camera seen in the direction of arrow 2 (Fig. 1);

Fig. 3 is a vertical transverse section taken on line 3—3, Fig. 1;

Fig. 4 is a section taken on line 4—4, Fig. 1;

Fig. 5 is a section taken on line 5—5, Fig. 1; and

Fig. 6 is a detail on a larger scale, showing the spring motor in its relation to the stop.

The same or similar reference characters will be used to designate the same or similar parts throughout the several views.

Numeral 1 represents the camera as a whole, and as the camera is merely an ordinary camera of well known make, which has been only slightly modified for the purpose of attaching my improved mechanism thereto, I shall describe only such parts thereof as cooperate with my improvement. The spool containing the unexposed film is indicated on the drawing by the numeral 2, and the spool for the exposed film is indicated by numeral 3, while the film is represented by the part marked 4. The key 5 is the one by means of which the spool 3 is rotated when it is desired to start the film onto the spool 3, or in case the automatic mechanism should fail for any reason to operate. The side of the camera, which is to the top in Fig. 1, and which I shall refer to as the top of the camera, is modified only to the slight extent shown in Fig. 3, which will hereinafter be described.

My mechanism is shown attached to the bottom of the camera in Figs. 1 and 3, and consists of a casing 6 which is secured to the bottom of the camera by suitable screws or rivets 7. In one end of casing 6 I pivot a tubular bearing 8 which has one end 9 of decreased diameter which extends within the camera and serves as a rest for the bottom of spool 3. At the juncture of parts 8 and 9 a shoulder is formed which engages the inside of the casing 6, while a collar 10 is secured to the member 8 and cooperates with the casing 6 to prevent longitudinal movement of the member. Within the tubular member 8 is a plunger 11 which is provided at its upper end with a transverse part 12 which engages a corresponding notch in the end of the spool. A ring 13 is pivotally attached to the lower end of the plunger 11 and serves as the means by which plunger 11 may be reciprocated with respect to member 8, and by means of which member 8 as well as the spool may be rotated. The upper end of part 9 has diametrically opposed slots which cooperate with the part 12 to prevent relative rotation of members 9 and 11. Mounted on member 8 is a gear 14 which is provided with a pawl 15 which cooperates with a ratchet 16 on member 8 to permit free relative rotation in one direction only. The spool 3 can be rotated by either key 5 or 13 to wind film thereon.

In order to automatically rotate the spool 3, I provide a spring 17 and a train of gears, by means of which the power stored in spring 17 will rotate the wheel 14 and spool 3. The spring 17 has one end secured to the shaft 18 on which the gear 19 is non-rotatably but slidably mounted; the other end of the spring is secured by means 20 to a stationary portion of casing 6. On a shaft 21 I mount two idlers 22 and 23, the former of which cooperates with gear 19, and the latter with gear 14. It is apparent that when spring 17 is under tension and tends to rotate wheel 19 in the direction of the arrow, wheel 14 will tend to rotate in the proper direction for winding the film 4 onto spool 3. Spring 17 must, of course, be of such strength that it will wind the film from spool 2 to spool 3 whenever it is permitted to operate. In order to prevent the operation of spring 17, except as and when desired, I mount rotatably but non-slidably on shaft 18 a disc 24, which is provided with a stop 25 for engaging a similar stop 26 on gear 19 when the latter tends to turn. A pair of spaced collars 27 hold the disc 24 from longitudinal movement on shaft 18, and a spring 28 tends to hold disc 24 against gear 19. It is apparent that I must provide disc 24 with means which will prevent it from rotating when urged to do so by the action of spring 17, and this means is obtained in the following manner. On the upper side of disc 24 (Figs. 1 and 6) I provide a grooved pulley 29, which has what may be termed a wire belt 30 wound thereabout and positively anchored thereto at one point. A shaft 31, having one end bent at right angles and resting on the film surface on spool 3, is rotatably mounted and provided at its lower end with a pulley 33. The belt joins pulleys 29 and 33 in the manner shown in Fig. 4, and any tendency of disc 24 to be rotated by gear 19 is resisted by the wire belt 30 and the stop 32 in the manner clearly apparent from an inspection of Fig. 4.

I now provide means whereby the disc 24 may be moved away from gear 19 a sufficient distance to permit stop 25 to disengage stop 26 so as to permit the gears to rotate. For this purpose I have mounted shaft 18 in such a manner that it has a limited longitudinal movement, and by pressing down on button 34, stop 25 will be removed from the path of stop 26 and gear 19 will be permitted to rotate. The button 34 needs to be depressed only for an instant and spring 28 will cause disc 24 to move back to its original position and to engage stop 26 when gear 19 has made approximately one revolution. The ratios of the gears are such that gear 19 will have to move slightly less than one revolution to wind the first exposed film onto spool 3.

It will be noted that the effective diameter of spool 3 is constantly increasing as the film is wound thereon, and as a result of this I must provide means whereby the rotation of gear 19 is varied inversely with the effective diameter of the film. As explained above, arm 32 rests on the film and as the film builds up the pulley 33 is caused to rotate in a counter-clockwise direction (Fig. 4). Therefore, as the film is wound, stop 25 is constantly moving in a direction counter to that of gear 19 and permits the latter to rotate less for each film. By properly proportioning pulleys 33 and 29, the movement of stop 25 can be made to compensate almost exactly for the increased diameter of spool 3, with the result that the same length of film will be wound thereon at each operation.

It is desirable to make the operation entirely automatic, and I have therefore provided means whereby the operation of the shutter lever 35 will automatically disengage the stops 25 and 26 on its return stroke.

Referring now to Figs. 3 and 4, I have provided a rod 36 which is rotatably mounted in bearings 37 and 38 and has one end provided with fingers 39 which engage a suitable means on disc 24. When rod 36 is slightly rotated, disc 24 will be moved a sufficient distance to disengage the stops 25 and 26 and thus permit gear 19 to rotate. The rod 36 is rotated automatically by the following means: A plunger extends transversely of the camera and has one end resting on the bent portion 41 of rod 36 (Fig. 4) and the other end of rod 40 is engaged by the end of the bell crank lever 42. When an instantaneous exposure is to be made, shutter lever 35 is moved in the direction of the arrow (Figs. 2 and 3) and rides over the upper end 43 of the bell crank lever 42, and when lever 35 returns through the action of the spring 44, it will rotate bell crank 42 clockwise and move the rod 42 downwardly, thus rotating rod 36 and releasing the means which holds the gear 19 from rotating, and permitting the gears to operate and wind the film onto spool 3.

When it is desired to take a time exposure picture, the bell crank lever is held out of the path of lever 35 by pressure on the plunger 45.

From the above it will appear that I have produced a device which automatically shifts the film after every exposure, and which can be applied to cameras of ordinary construction without appreciably changing the same.

I am aware that the object sought to be accomplished can be obtained by specifically different means than those shown, and the drawings are therefore merely illustrative of one embodiment and should not be considered as limiting the invention to the exact structure shown, as changes can be made within the scope of the appended claim without departing from the inventive idea disclosed.

Having now described my invention, what I claim is

In a camera having a strip of film, a spool for the reception of said film, means for rotating said spool, said means comprising a spring motor, means rotating in unison with said spool, said means carrying a stop, a second stop rotating about the same axis as the first stop and in the path thereof, means for rotating said second stop in the opposite direction from the first stop and to an extent proportional to the amount of film on the spool, said means comprising a feeler resting on the surface of the film.

In testimony whereof I affix my signature.

IRVING HERSHEY.